United States Patent
Yoshimi et al.

(10) Patent No.: US 8,590,410 B2
(45) Date of Patent: Nov. 26, 2013

(54) AUTOMATIC DUAL-CLUTCH TRANSMISSION

(75) Inventors: Takuya Yoshimi, Okazaki (JP); Norio Kayukawa, Konan (JP); Shiro Ogami, Kariya (JP); Yuichi Fukuhara, Toyoake (JP)

(73) Assignee: Aisin AI Co., Ltd., Nishio-shi (JP)

( * ) Notice: Subject to any disclaimer, the term of this patent is extended or adjusted under 35 U.S.C. 154(b) by 104 days.

(21) Appl. No.: 13/202,223

(22) PCT Filed: Feb. 22, 2010

(86) PCT No.: PCT/JP2010/052598
§ 371 (c)(1),
(2), (4) Date: Aug. 18, 2011

(87) PCT Pub. No.: WO2010/098272
PCT Pub. Date: Sep. 2, 2010

(65) Prior Publication Data
US 2011/0296948 A1 Dec. 8, 2011

(30) Foreign Application Priority Data
Feb. 24, 2009 (JP) ................................. 2009-040467

(51) Int. Cl.
*F16H 3/08* (2006.01)
(52) U.S. Cl.
USPC .......................................................... 74/330
(58) Field of Classification Search
USPC ..................................... 74/330, 331, 333, 340
See application file for complete search history.

(56) References Cited

U.S. PATENT DOCUMENTS

| 4,790,418 | A | 12/1988 | Brown et al. | |
| 6,257,084 | B1 | 7/2001 | Yoshina et al. | |
| 6,973,849 | B2 * | 12/2005 | Hosono | 74/330 |
| 7,249,532 | B2 * | 7/2007 | Ruedle | 74/330 |
| 7,409,885 | B2 * | 8/2008 | Krauss et al. | 74/340 |

(Continued)

FOREIGN PATENT DOCUMENTS

| CN | 101072960 A | 11/2007 |
| CN | 101082364 A | 12/2007 |

(Continued)

OTHER PUBLICATIONS

European Office Action Issued Dec. 7, 2012 in Patent Application No. 10 746 153.5.

(Continued)

*Primary Examiner* — Ha D Ho
(74) *Attorney, Agent, or Firm* — Oblon, Spivak, McClelland, Maier & Neustadt, L.L.P.

(57) ABSTRACT

In an automatic dual-clutch transmission, a lowest speed driven gear, other driven gears and a reverse gear are provided on a first output shaft to be freely rotatable. A 2nd speed driven gear and a highest speed driven gear are provided on a second output shaft to be freely rotatable. Further, the 2nd speed driven gear is provided with a large-diameter gear meshing with a 2nd speed drive gear and a small-diameter gear provided bodily with the large-diameter gear, being fewer in tooth number and smaller in diameter than the large-diameter gear, and meshing with the reverse gear. Thus, the automatic dual-clutch transmission is reduced in diameter by not having an output shaft dedicated to the reverse gear and is able to set the gear ratio for reverse to be large.

4 Claims, 4 Drawing Sheets

(56) References Cited

U.S. PATENT DOCUMENTS

| | | |
|---|---|---|
| 2005/0000307 A1 | 1/2005 | Gumpoltsberger |
| 2006/0266144 A1 | 11/2006 | Schafer et al. |
| 2007/0107542 A1 | 5/2007 | Gumpoltsberger |
| 2007/0220999 A1 | 9/2007 | Hatori et al. |
| 2008/0196543 A1 | 8/2008 | Kobayashi et al. |
| 2010/0319486 A1 | 12/2010 | Kawamoto et al. |
| 2011/0167957 A1 | 7/2011 | Kato et al. |

FOREIGN PATENT DOCUMENTS

| | | |
|---|---|---|
| CN | 101131198 A | 2/2008 |
| DE | 103 10 472 A1 | 10/2003 |
| DE | 10 2004 056 9 | 6/2006 |
| EP | 1 862 701 A1 | 12/2007 |
| FR | 2 880 089 A1 | 6/2006 |
| JP | 8 74949 | 3/1996 |
| JP | 2001 82554 | 3/2001 |
| JP | 2004 239441 | 8/2004 |
| JP | 2007 255558 | 10/2007 |
| JP | 2007 534899 | 11/2007 |
| JP | 2008 202640 | 9/2008 |
| JP | 2008 291893 | 12/2008 |

OTHER PUBLICATIONS

Extended European Search Report issued Mar. 7, 2012 in Patent Application No. 10746153.5.
International Search Report Issued Apr. 6, 2010 in PCT/JP10/052598 filed Feb. 22, 2010.
Office Action issued Aug. 1, 2013, in Chinese Patent Application No. 201080007068.2 (with English translation).

* cited by examiner

| Speed Change Stages | Gear Ratios | Gear Ratio Steps |
|---|---|---|
| 1st | 16.75 | |
| 2nd | 9.88 | 1.70 |
| 3rd | 6.60 | 1.50 |
| 4th | 4.83 | 1.37 |
| 5th | 3.85 | 1.25 |
| 6th | 3.27 | 1.18 |
| 7th | 2.81 | 1.16 |
| Rev | 14.3 | |

(a) Gear Ratios (b) Gear Ratio Steps

AUTOMATIC DUAL-CLUTCH TRANSMISSION

TECHNICAL FIELD

The present invention relates to an automatic dual-clutch transmission having a dual clutch which is capable of transmitting the rotational drive power from a prime mover to each of two input shafts.

BACKGROUND ART

In recent years, attention has been drawn to automatic dual-clutch transmissions capable of avoiding torque discontinuation at the time of a shift change. As automatic dual-clutch transmissions, there is one which is described in, e.g., JP2007-534899 A (Patent Document 1). The automatic dual-clutch transmission has an output shaft dedicated to a reverse gear, in addition to two input shafts provided coaxially, a first output shaft supporting driven gears at lower-speed stages and a second output shaft supporting driven gears at higher-speed stages. Accordingly, the provision of the output shaft dedicated to the reverse gear gives rise to a problem that the apparatus becomes large in outer diameter as a whole.

On the other hand, German Patent application publication No. 10305241 (Patent Document 2) describes an automatic dual-clutch transmission which does not have an output shaft dedicated to a reverse gear. It is described that the automatic transmission is provided with a reverse gear on a first output shaft supporting forward gears thereon. With this, because an output shaft dedicated to the reverse gear is not provided, it is possible to downsize the apparatus as a whole in outer diameter.

PRIOR ART DOCUMENT

Patent Documents

Patent Document 1: JP2007-534899 A (FIG. 1)
Patent Document 2: German Patent Application Publication No. 10305241 (FIG. 1)

SUMMARY OF THE INVENTION

Problem to be Solved by the Invention

The automatic transmission described in Patent Document 2 is constructed to provide a 2nd speed drive gear on a first input shaft, to freely rotatably carry on the first output shaft a 2nd speed driven gear meshing with the 2nd speed drive gear, and to freely rotatably carry on a second output shaft a reverse gear meshing with the 2nd speed driven gear. That is, the reverse gear meshes directly with the 2nd speed driven gear itself which is in meshing with the 2nd speed drive gear.

Here, since the gear ratio for 2nd speed has to be set to be relatively larger, it is required to make the 2nd speed drive gear relatively smaller in diameter and to make the 2nd speed driven gear relatively larger in diameter. Further, it is also desirable to make the gear ratio for reverse also larger. Particularly, it is desirable to set the gear ratio for reverse to be larger than the gear ratio for 2nd speed.

Then, in the automatic transmission described in Patent Document 2, due to the reverse gear meshing directly with the 2nd speed driven gear, the gear ratio for reverse becomes the gear ratio of the 2nd speed driven gear to the reverse gear in addition to the gear ratio of the 2nd speed drive gear to the 2nd speed driven gear. However, because the 2nd speed driven gear is required to be larger in diameter as mentioned earlier, it is unable to make the gear ratio of the 2nd speed driven gear to the reverse gear larger. For this reason, the gear ratio for the reverse gear becomes substantially equal to the gear ratio for 2nd speed, so that it is unable to set the gear ratio for reverse to be sufficiently larger.

The present invention has been made taking the aforementioned circumstances into consideration, and an object thereof is to provide an automatic dual-clutch transmission which is capable of setting the gear ratio for reverse to be larger though downsizing in diameter can be realized by not having an output shaft dedicated to a reverse gear.

Solution to the Problem

An automatic dual-clutch transmission according to the present invention in a first aspect comprises:

a first input shaft and a second input shaft arranged coaxially, a first output shaft and a second output shaft arranged in parallel to the first input shaft, a dual clutch having a first clutch for transmitting a rotational drive power from a prime mover to the first input shaft and a second clutch for transmitting the rotational drive power to the second input shaft, a plurality of odd-number stage drive gears comprising gears for odd-number stages and fixedly provided on the first input shaft, a plurality of even-number stage drive gears comprising gears for even-number stages and fixedly provided on the second input shaft, a plurality of first driven gears provided on the first output shaft to be freely rotatable, including at least a lowest speed driven gear and meshing with some gears of the odd-number stage drive gears and the even-number stage drive gears, a plurality of second driven gears provided on the second output shaft to be freely rotatable, including at least a highest speed driven gear and meshing with remaining gears of the odd-number stage drive gears and the even-number stage drive gears, a reverse gear provided on the first output shaft to be freely rotatable and meshing with a 2nd speed driven gear of the plurality of second driven gears, a first output shaft side gearshift clutch for connecting a gear selected from the plurality of first driven gears and the reverse gear with the first output shaft not to be relatively rotatable, and a second output shaft side gearshift clutch for connecting a gear selected from the plurality of second driven gears with the second output shaft not to be relatively rotatable, wherein the 2nd speed driven gear comprises:

a large-diameter gear meshing with the 2nd speed drive gear, of the even-number stage fixed gears, and a small-diameter gear provided bodily with the large-diameter gear, being fewer in tooth number and smaller in diameter than the large-diameter gear and meshing with the reverse gear.

According to the present invention in the first aspect, the reverse gear is supported on the first output shaft. Thus, because there is not provided any output shaft dedicated to the reverse gear, it is possible to downsize the whole of the apparatus in outer diameter. Further, according to the present invention in the first aspect, the 2nd speed driven gear has the large-diameter gear and the small-diameter gear. Then, the large-diameter gear meshes with the 2nd speed drive gear, and the small-diameter gear meshes with the reverse gear. That is, the gear ratio for reverse becomes one which is made by multiplying the gear ratio of the 2nd speed drive gear to the large-diameter gear of the 2nd speed driven gear with the gear ratio of the small-diameter gear of the 2nd speed driven gear to the reverse gear. With the construction like this, it is possible to set the gear ratio for reverse larger than the gear ratio for 2nd speed.

Further, the reverse gear is supported on the first output shaft, and the 2nd speed driven gear is supported on the second output shaft. Here, the first output shaft has the lowest speed driven gear supported thereon. On the other hand, the second output shaft has the highest speed driven gear supported thereon. Because the gear ratio for the lowest speed is required to be largest, the lowest speed driven gear is made to be largest in diameter of the driven gears. Because the gear ratio for the highest speed is required to be smallest, on the contrary, the highest speed driven gear is made to be smallest in diameter of the driven gears. Thus, it is possible to make the separation distance from the input shafts to the first output shaft longer than the separation distance from the input shafts to the second output shaft. By providing the reverse gear on the first output shaft and by providing the 2nd speed driven gear on the second output shaft, it is possible to make the reverse gear larger in diameter than the 2nd speed driven gear. This, in addition to the fact that the aforementioned 2nd speed driven gear has the large-diameter gear and the small-diameter gear, makes it further reliable and easy to set the gear ratio for reverse larger than the gear ratio for 2nd speed.

Preferably, according to the present invention in a second aspect, the 2nd speed drive gear is formed directly on the outer circumferential surface of the second input shaft, the second output shaft side gearshift clutch is provided between the large-diameter gear of the 2nd speed driven gear and the second driven gear provided to be adjacent to the 2nd speed driven gear on a side opposite to the dual clutch in the axial direction, and the small-diameter gear is provided on the second output shaft on the dual clutch side in comparison with the large-diameter gear in the axial direction.

Thus, according to the present invention in the second aspect, it is possible to prevent the whole of the apparatus from being extended in axial length. This reason will be described. Where the 2nd speed drive gear is formed directly on the outer circumferential surface of the second input shaft, in order for the 2nd speed drive gear to have an effective gear tooth width, it is necessary to form cutting ending portions or groove portions on both outsides in the axial direction of the effective gear tooth width of the 2nd speed drive gear. That is, in order for the 2nd speed drive gear to have the effective gear tooth width, spaces are required on both outsides in the axial direction of the effective gear tooth width of the 2nd speed drive gear. Thus, forming the 2nd speed drive gear directly on the outer circumferential surface of the second input shaft results in a cause for enlarging the axial length of the second input shaft. The enlargement in the axial length of the second input shaft results in the enlargement in the axial length of the whole of the apparatus.

According to the present invention in the second aspect, on the contrary, the second output shaft side gearshift clutch is provided on the side opposite to the dual clutch in the axial direction with respect to the large-diameter gear of the 2nd speed driven gear. The 2nd speed drive gear mashes with the large-diameter gear. Thus, on the second input shaft, an area which is not used at all exists over the axial width where the second output shaft side gearshift clutch exists, on the side opposite in the axial direction to the dual clutch with respect to the 2nd speed drive gear.

Further, according to the present invention in the second aspect, the small-diameter gear of the 2nd speed driven gear is provided on the dual clutch side in comparison with the large-diameter gear. That is, on the second input shaft, an area which is not used at all exists over the axial width where the small-diameter gear exists, on the dual clutch side of the 2nd speed drive gear.

That is, according the present invention in the second aspect, on the second input shaft, areas which are not used at all exist on both axial outsides of the 2nd speed drive gear. Therefore, by utilizing these both areas as gear cutting ending portions or groove portions which are formed on both axial outsides of an effective gear tooth width of the 2nd speed driven gear, it is possible to enable the 2nd speed drive gear to have a sufficient effective gear tooth width without enlarging the axial length of the second input shaft.

Further preferably, according to the present invention in a third aspect, on the first output shaft, the reverse gear, a 4th speed driven gear, a 3rd speed driven gear and a 1st speed driven gear are provided in turn from the dual clutch side in the axial direction, on the second output shaft, the 2nd speed driven gear, a 6th speed driven gear and a 5th speed driven gear are provided in turn from the dual clutch side in the axial direction, the first output shaft side gearshift clutch is composed of a clutch for connecting the reverse gear or the 4th speed driven gear with the first output shaft not to be relatively rotatable and a clutch for connecting the 3rd speed driven gear or the 1st speed driven gear with the first output shaft not to be relatively rotatable, and the second output shaft side gearshift clutch is composed of a clutch for connecting the 2nd speed driven gear or the 6th speed driven gear with the second output shaft not to be relatively rotatable and a clutch for connecting the 5th speed driven gear with the second output shaft not to be relatively rotatable.

Further desirably, according to the present invention in a fourth aspect, on the first output shaft, the reverse gear, a 4th speed driven gear, a 3rd speed driven gear and a 1st speed driven gear are provided in turn from the dual clutch side in the axial direction, on the second output shaft, the 2nd speed driven gear, a 6th speed driven gear, a 5th speed driven gear and a 7th speed driven gear are provided in turn from the dual clutch side in the axial direction, the 7th speed driven gear is provided on a side opposite in the axial direction to the dual clutch with respect to the 1st speed driven gear, the first output shaft side gearshift clutch is composed of a clutch for connecting the reverse gear or the 4th speed driven gear with the first output shaft not to be relatively rotatable and a clutch for connecting the 3rd speed driven gear or the 1st speed driven gear with the first output shaft not to be relatively rotatable, and the second output shaft side gearshift clutch is composed of a clutch for connecting the 2nd speed driven gear or the 6th speed driven gear with the second output shaft not to be relatively rotatable and a clutch for connecting the 5th speed driven gear or the 7th speed driven gear with the second output shaft not to be relatively rotatable.

According to the present invention in the fourth aspect, the apparatus has the 1st speed to the 7th speed. Further, all of the odd-number stage drive gears are provided on the first input shaft, while all of the even-number stage drive gears are provided on the second input shaft. Thus, torque discontinuation does not take place at the time of a gear shifting, and gear ratio steps can be made to be relatively regular intervals for respective speed change stages. Accordingly, it is possible to perform the gear shifting very smoothly.

Further preferably, according to the present invention in a fifth aspect, the odd-number stage drive gears include a 3rd speed drive gear and a 5th speed drive gear which differs from the 3rd speed drive gear in outer diameter and tooth number.

According to the present invention in the fifth aspect, the 3rd speed drive gear and the 5th speed drive gear are provided separately. Thus, it is possible to set the gear ratios for 3rd speed and 5th speed respectively to suitable gear ratios.

EMBODIMENT FOR PRACTICING THE INVENTION

Hereafter, an embodiment which concretizes an automatic dual-clutch transmission according to the present invention will be described with reference to FIGS. 1 through 6.

Figure 1:
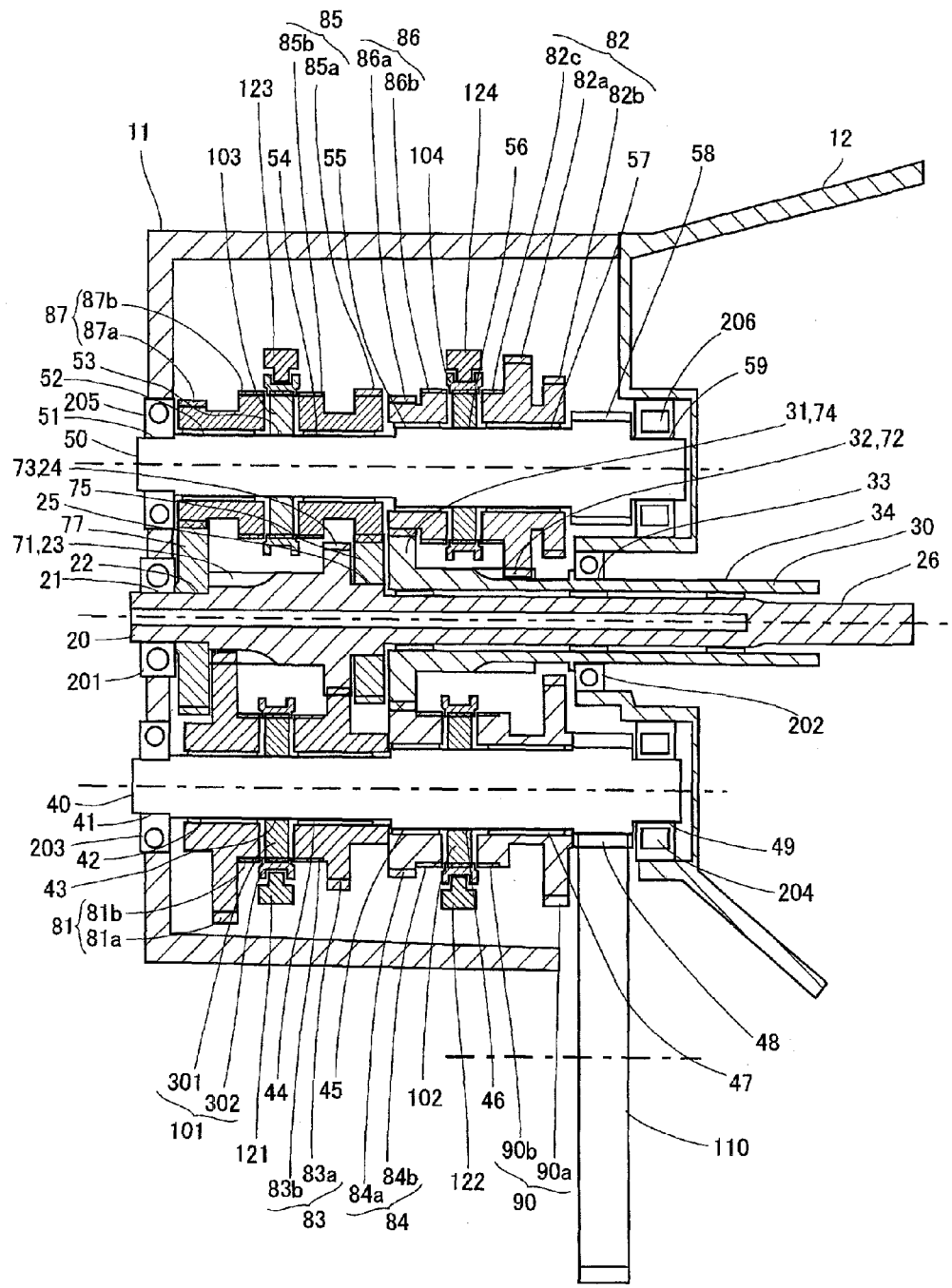
FIG. 1 is a longitudinal-sectional view of an automatic dual-clutch transmission.
Figure 2:
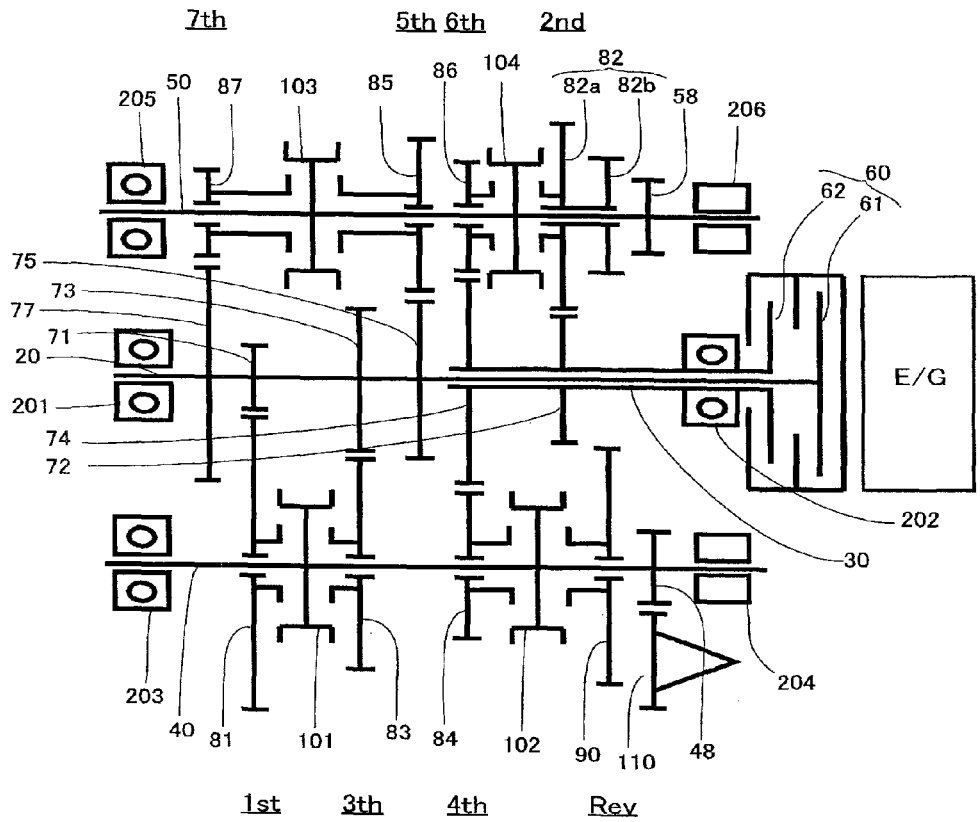
FIG. 2 is a skeletal view showing the overall structure of the automatic dual-clutch transmission.

As shown in FIGS. 1 and 2, the automatic dual-clutch transmission in the present embodiment is provided, in housings 11, 12, with a first input shaft 20, a second input shaft 30, a first output shaft 40, a second output shaft 50, a dual clutch 60, drive gears 71, 72, 73, 74, 75, 77 for respective gear change stages, driven gears 81, 82, 83, 84, 85, 86, 87 for respective gear change stages, a reverse gear 90, respective gearshift clutches 101, 102, 103, 104, a reduction driven gear 110, respective forks 121, 122, 123, 124, and fork drive mechanisms 130.

The first input shaft 20 takes the form of a tubular shaft and is rotatably supported by a bearing 201 in the housing 11. The outer circumferential surface of the first input shaft 20 is composed of a bearing support portion 21, a 7th speed drive gear press-fitting portion 22, a small-diameter external gear portion 23, a large-diameter external gear portion 24, a 5th speed drive gear press-fitting portion 25, and a connection shaft portion 26 which are formed in turn from the left end in FIG. 1.

The bearing support portion 21 is a portion supporting the bearing 201. The 7th speed drive gear press-fitting portion 22 has an external spline formed thereon, on which a 7th speed drive gear 77 is press-fitted through spline engagement. The small-diameter external gear portion 23 is formed as an external gear which is somewhat larger in diameter than the 7th speed drive gear press-fitting portion 22. The small-diameter external gear portion 23 constitutes a 1st speed drive gear 71. In other words, the 1st speed drive gear 71 is formed directly on the outer circumferential surface of the first input shaft 20. A cutting ending portion is formed on the right outside in the axial direction of an effective gear tooth width of the small-diameter external gear portion 23, and the 7th speed drive gear press-fitting portion 22 being small in diameter is positioned on the left outside in the axial direction of the effective gear tooth width.

The large-diameter external gear portion 24 takes a disc-like shape being larger in diameter than the small-diameter external gear portion 23 and acts as an external gear. The large-diameter external gear portion 24 constitutes a 3rd speed drive gear 73. That is, the 3rd speed drive gear 73 is formed directly on the outer circumferential surface of the first input shaft 20. An external spline having a smaller diameter than the small-diameter external gear portion 23 is formed on the 5th speed drive gear press-fitting portion 25, on which a 5th speed drive gear 75 is press-fitted through spline engagement. The connection shaft portion 26 is cylindrical and has a length corresponding to two-thirds or so of the entire length of the first input shaft 20. The connection shaft portion 26 is connected to a first clutch 61 of the dual clutch 60.

The second input shaft 30 takes the form of a tubular shaft, is rotatably supported through a plurality of bearings on the outer circumference of the connection shaft portion 26 of the first input shaft 20, and is rotatably supported by a bearing 202 in the housing 12. That is, the second input shaft 30 is arranged in co-coaxial alignment with the first input shaft 20 to be rotatable relative to the same. The outer circumferential surface of the second input shaft 30 is composed of a large-diameter external gear portion 31, a small-diameter external gear portion 32, a bearing support portion 33, and a connection shaft portion 34 which are formed in turn from the left end in FIG. 1.

The large-diameter external gear portion 31 takes the form of large-diameter disc and acts as an external gear. The large-diameter external gear portion 31 constitutes a 4th/6th speed drive gear 74. That is, the 4th/6th speed drive gear 74 is formed directly on the outer circumferential surface of the second input shaft 30. The small-diameter external gear portion 32 is an external gear which is smaller in diameter than the large-diameter external gear portion 31. The small-diameter external gear portion 32 constitutes a 2nd speed drive gear 72. That is, the 2nd speed drive gear 72 is formed directly on the outer circumferential surface on the second input shaft 30. A cutting ending portion is formed on the left outside in the axial direction of an effective gear tooth width of the small-diameter external gear portion 32, and a groove portion is formed on the right outside in the axial direction of the effective gear tooth width. A fourth gearshift clutch 104 is located in alignment with the axial position of the cutting ending portion. A small-diameter gear 82b of a 2nd speed driven gear 82 is positioned in alignment with the axial position of the groove portion.

The bearing support portion 33 is a portion supporting the bearing 202. The connection shaft portion 34 is cylindrical and has a length corresponding to half or so of the entire length of the second input shaft 30. The connection shaft portion 34 is connected to a second clutch 62 of the dual clutch 60.

The first output shaft 40 is rotatably supported by the housing 11 through bearings 203, 204 and is arranged in the housing 11 in parallel to the first input shaft 20. The outer circumferential surface of the first output shaft 40 is composed of a bearing support portion 41, a 1st speed driven gear support portion 42, a first hub press-fitting portion 43, a 3rd speed driven gear support portion 44, a 4th speed driven gear support portion 45, a second hub press-fitting portion 46, a reverse gear support portion 47, a final reduction drive gear 48, and a bearing support portion 49 which are formed in turn from the left end in FIG. 1.

The bearing support portion 41 is a portion supporting the bearing 203. The 1st speed driven gear support portion 42, the 3rd speed driven gear support portion 44, the 4th speed driven gear support portion 45 and the reverse gear support portion 47 respectively support a 1st speed driven gear 81, a 3rd speed driven gear 83, a 4th speed driven gear 84 and a reverse gear 90 to be freely rotatable. Hubs of the first gearshift clutch 101 and the second gearshift clutch 102 are press-fitted on the first hub press-fitting portion 43 and the second hub press-fitting portion 46 through spline engagements, respectively. The final reduction drive gear 48 is formed with an external gear, and the bearing support portion 49 is a portion supporting the bearing 204.

The second output shaft 50 is rotatably supported by the housing 11 through bearings 205, 206 and is arranged in the housing 11 in parallel to the first input shaft 20. The outer circumferential surface of the second output shaft 50 is composed of a bearing support portion 51, a 7th speed driven gear support portion 52, a third hub press-fitting portion 53, a 5th speed driven gear support portion 54, a 6th speed driven gear support portion 55, a fourth hub press-fitting portion 56, a 2nd speed driven gear support portion 57, a final reduction drive gear 58 and a bearing support portion 59 which are formed in turn from the left end in FIG. 1.

The bearing support portion 51 is a portion supporting the bearing 205. The 7th speed driven gear support portion 52, the 5th speed driven gear support portion 54, the 6th speed driven gear support portion 55 and the 2nd speed driven gear support portion 57 respectively support a 7th speed driven gear 87, a 5th speed driven gear 85, a 6th speed driven gear 86 and a 2nd speed driven gear 82 to be freely rotatable. Hubs of the third gearshift clutch 103 and the fourth gearshift clutch 104 are press-fitted on the third hub press-fitting portion 53 and the fourth hub press-fitting portion 56 through spline engagements, respectively. The final reduction drive gear 58 is formed with an external gear, and the bearing support portion 59 is a portion supporting the bearing 206.

The dual clutch 60 has the first clutch 61 for transmitting a rotational drive power from a prime mover E/G to the first input shaft 20 and the second clutch 62 for transmitting the rotational drive power from the prime mover E/G to the second input shaft 30. The dual clutch 60 is on the right side of the first input shaft 20 and the second input shaft 30 in FIG. 1 and is provided coaxially. The first clutch 61 is connected with the right end in FIG. 1 of the connection shaft portion 26 of the first input shaft 20, and the second clutch 62 is connected with the right end in FIG. 1 of the connection shaft portion 34 of the second input shaft 30.

The odd-number stage drive gears 71, 73, 75, 77 are formed directly on the first input shaft 20 or are provided individually to be secured thereto, and the even-number stage drive gears 72, 74 are formed directly on the second input shaft 30 or are provided individually to be secured thereto. Specifically, the construction is as follows.

As mentioned earlier, the 1st speed drive gear 71 and the 3rd speed drive gear 73 are respectively the small-diameter external gear portion 23 and the large-diameter external gear portion 24 of the first input shaft 20. The 5th speed drive gear 75 takes the form of a hollow disc having an internal spline and an external gear and is press-fitted on the 5th speed drive gear press-fitting portion 25 through spline engagement. The 7th speed drive gear 77 takes the form of a hollow disc having an internal spline and an external gear and is press-fitted on the 7th speed drive gear press-fitting portion 22 through spline engagement. As mentioned earlier, the 2nd speed drive gear 72 and the 4th/6th speed drive gear 74 are respectively the small-diameter external gear portion 32 and the large-diameter external gear portion 31 of the second input shaft 30.

Here, outer diameter and the number of gear teeth are made to be larger and increased in the order of the 1st speed drive gear 71, the 2nd speed drive gear 72, the 3rd speed drive gear 73, the 4th/6th speed drive gear 74, the 5th speed drive gear 75 and the 7th speed drive gear 77. Further, in the axial direction, arrangement is made from the dual clutch 60 side in the order of the 2nd speed drive gear 72, the 4th/6th speed drive gear 74, the 5th speed drive gear 75, the 3rd speed drive gear 73, the 1st speed drive gear 71 and the 7th speed drive gear 77.

The 1st, 3rd and 4th speed driven gears 81, 83, 84 (corresponding to first driven gears in the present invention) are respectively provided on the 1st speed driven gear support portion 42, the 3rd speed driven gear support portion 44 and the 4th speed driven gear support portion 45 of the first output shaft 44 to be freely rotatable. Specifically, the 1st speed driven gear 81 is provided with a large-diameter gear 81a and a synchronizing gear portion 81b. The large-diameter gear 81a always meshes with the 1st speed drive gear 71. The synchronizing gear portion 81b is formed bodily with the large-diameter gear 81a and has an external gear on the right side of the large-diameter gear 81a in FIG. 1.

The 3rd speed driven gear 83 is provided with a large-diameter gear 83a and a synchronizing gear portion 83b. The large-diameter gear 83a always meshes with the 3rd speed drive gear 73. The synchronizing gear portion 83b is formed bodily with the large-diameter gear 83a and has an external gear on the left side of the large-diameter gear 83a in FIG. 1. The 4th speed driven gear 84 is provided with a large-diameter gear 84a and a synchronizing gear portion 84b. The large-diameter gear 84a always meshes with the 4th/6th speed drive gear 74. The synchronizing gear portion 84b is formed bodily with the large-diameter gear 84a and has an external gear on the right side of the large-diameter gear 84a in FIG. 1.

Further, the 2nd, 5th, 6th and 7th speed driven gears 82, 85, 86 and 87 (corresponding to second driven gears in the present invention) are respectively provided on the 2nd speed driven gear support portion 57, the 5th speed driven gear support portion 54, the 6th speed driven gear support portion 55 and the 7th speed driven gear support portion 52 of the second output shaft 50 to be freely rotatable. Specifically, the 2nd speed driven gear 82 is provided with a large-diameter gear 82a, a small-diameter gear 82b and a synchronizing gear portion 82c. The large-diameter gear 82a always meshes with the 2nd speed drive gear 72. The small-diameter gear 82b is formed bodily with the large-diameter gear 82a and has an external gear on the right side of the large-diameter gear 82a in FIG. 1. The number of gear teeth on the small-diameter gear 82b is set to be fewer than that of gear teeth on the large-diameter gear 82a. Further, the small-diameter gear 82b takes the same position in the axial direction as the groove portion which is formed on the right side in FIG. 1 of the 2nd speed drive gear 72 of the second input shaft 30. The synchronizing gear portion 82c is formed bodily with the large-diameter gear 82a and has an external gear on the left side of the large-diameter gear 82a in FIG. 1.

The 5th speed driven gear 85 is provided with a large-diameter gear 85a and a synchronizing gear portion 85b. The large-diameter gear 85a always meshes with the 5th speed drive gear 75. The synchronizing gear portion 85b is formed bodily with the large-diameter gear 85a and has an external gear on the left side of the large-diameter gear 85a in FIG. 1. The 6th speed driven gear 86 is provided with a large-diameter gear 86a and a synchronizing gear 86b. The large-diameter gear 86a always meshes with the 4th/6th speed drive gear 74. The synchronizing gear portion 86b is formed bodily with the large-diameter gear 86a and has an external gear on the right side of the large-diameter gear 86a in FIG. 1. The 7th speed driven gear 87 is provided with a large-diameter gear 87a and a synchronizing gear portion 87b. The large-diameter gear 87a always meshes with the 7th speed drive gear 77. The synchronizing gear portion 87b is formed bodily with the large-diameter gear 87a and has an external gear on the right side of the large-diameter gear 87a in FIG. 1.

The reverse gear 90 is provided on the reverse gear support portion 47 of the first output shaft 40 to be freely rotatable. Specifically, the reverse gear 90 is provided with a large-diameter gear 90a and a synchronizing gear portion 90b. The large-diameter gear 90a always meshes with the small-diameter gear 82b of the 2nd speed driven gear 82. The synchronizing gear portion 90b is formed bodily with the large-diameter gear 90a and has an external gear on the left side of the large-diameter gear 90a in FIG. 1.

Each of the shift clutches 101, 102, 103 and 104 is provided with a hub 301 and a sleeve 302. Although the hubs and the sleeves of the respective gearshift clutches 101-104 are designated by the same reference numerals for convenience in explanation, they differ in shape from one another. However, they may be constructed to take the same shapes.

The hubs 301 take the shape of a hollow disc having an internal spline and an external spline formed thereon and are press-fitted on the external splines of the first output shaft 40 or the second output shaft 50 through spline engagements. The sleeves 302 mesh with the external splines of the hubs 301 to be slidable relative to the hubs 301 in the axial direction and, when slidden, are brought into meshing with the synchronizing gear portions of the driven gears 81-87 at the gear change stages or the reverse gear 90. That is, the sleeves 302 serve as switches for switching the meshing states and the out-of-meshing states with the driven gears 81-87 at the gear change stages and the reverse gear 90. The details are as a follows:

The first gearshift clutch 101 (corresponding to a first output shaft side gearshift clutch in the present invention) is provided at the first hub press-fitting portion 43 of the first output shaft 40 and is provided between the synchronizing gear portion 81b of the 1st speed driven gear 81 and the synchronizing gear portion 83b of the 3rd speed driven gear 83 in the axial direction. That is, one of the 1st speed driven gear 81 and the 3rd speed driven gear 83 and the first output shaft 40 are connected not to be relatively rotatable by sliding the sleeve 302 of the first gearshift clutch 101 in the axial direction.

The second gearshift clutch 102 (corresponding to a first output shaft side gearshift clutch in the present invention) is provided at the second hub press-fitting portion 46 of the first output shaft 40 and is provided between the synchronizing gear portion 84b of the 4th speed driven gear 84 and the synchronizing gear portion 90b of the reverse gear 90 in the axial direction. That is, one of the 4th speed driven gear 84 and the reverse gear 90 and the first output shaft 40 are connected not to be relatively rotatable by sliding the sleeve 302 of the second gearshift clutch 102 in the axial direction.

The third gearshift clutch 103 (corresponding to a second output shaft side gearshift clutch in the present invention) is provided at the third hub press-fitting portion 53 of the second output shaft 50 and is provided between the synchronizing gear portion 87b of the 7th speed driven gear 87 and the synchronizing gear portion 85b of the 5th speed driven gear 85 in the axial direction. That is, one of the 7th speed driven gear 87 and the 5th speed driven gear 85 and the second output shaft 50 are connected not to be relatively rotatable by sliding the sleeve 302 of the third gearshift clutch 103 in the axial direction.

The fourth gearshift clutch 104 (corresponding to a second output shaft side gearshift clutch in the present invention) is provided at the fourth hub press-fitting portion 56 of the second output shaft 50 and is provided between the synchronizing gear portion 86b of the 6th speed driven gear 86 and the synchronizing gear portion 82c of the 2nd speed driven gear 82 in the axial direction. That is, one of the 6th speed driven gear 86 and the 2nd speed driven gear 82 and the second output shaft 50 are connected not to be relatively rotatable by sliding the sleeve 302 of the fourth gearshift clutch 104 in the axial direction.

Figure 3:
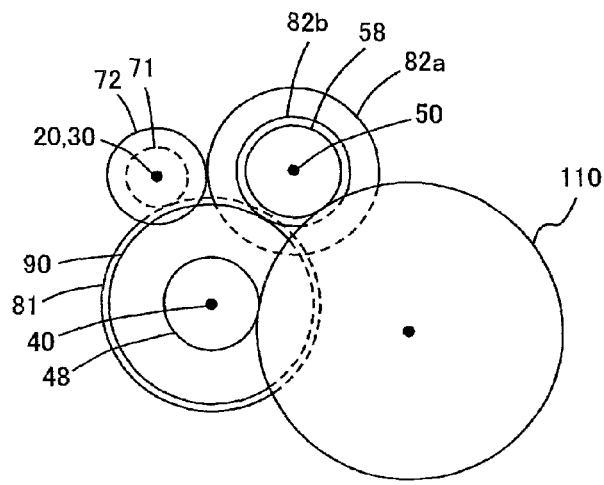
FIG. 3 is a reduced-scale view of the automatic dual-clutch transmission as viewed in the axial direction, but showing some of gears only.

As shown in FIG. 3, the reduction driven gear 110 meshes with the final reduction drive gear 48 and the final reduction drive gear 58. The reduction driven gear 110 is larger in diameter and in the number of gear teeth than the final reduction drive gears 48, 58. The reduction driven gear 110 is connected with driving wheels through a differential mechanism (not shown).

Each of the forks 121, 122, 123 and 124 are members for sliding the sleeves 302 of the first to fourth gearshift clutches 101-104 in the axial direction. The respective forks 121-124 are driven by the respective fork drive mechanisms 130.

Figures 4, 5:
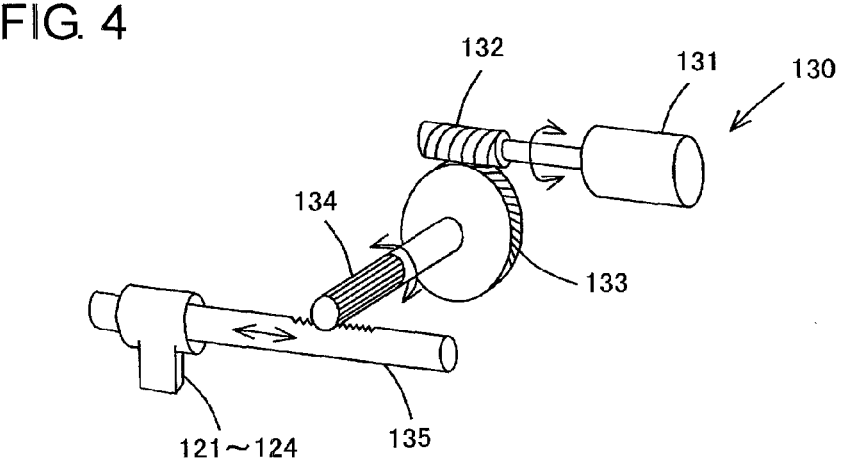
FIG. 4 is a view showing a moving mechanism for a fork.
FIG. 5 is a table showing gear ratios and gear ratio steps.

As shown in FIG. 4, each fork drive mechanism 130 is provided with a motor 131 having a worm gear 132 formed on a rotational shaft thereof, a worm wheel 133 meshing with the worm gear 132, a pinion gear 134 formed bodily with the worm wheel 133 in axial alignment with the same, and a rack shaft 135 meshing with the pinion gear 134. Either one of the forks 121-124 is bodily provided on the rack shaft 135. That is, by driving the motors 131 of the respective fork drive mechanisms 130, the forks 121-124 connected to the motors 131 are slidden in the axial direction of the first output shaft 40 or the second output shaft 50.

Figure 6:
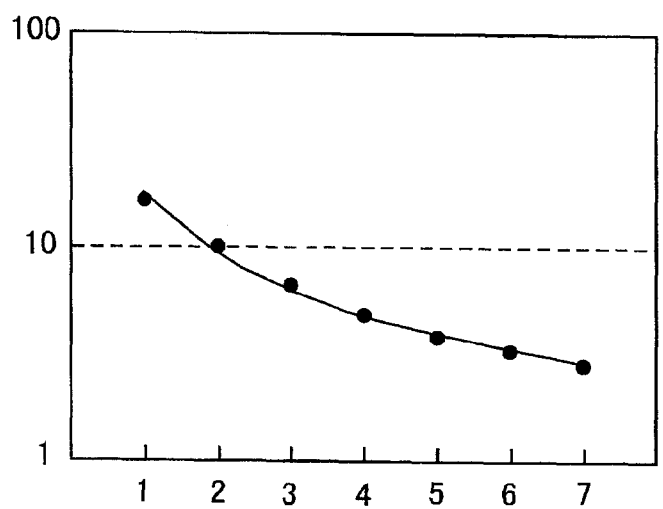
FIG. 6 is graphs showing the gear ratios and the gear ratio steps.
Figure 6:
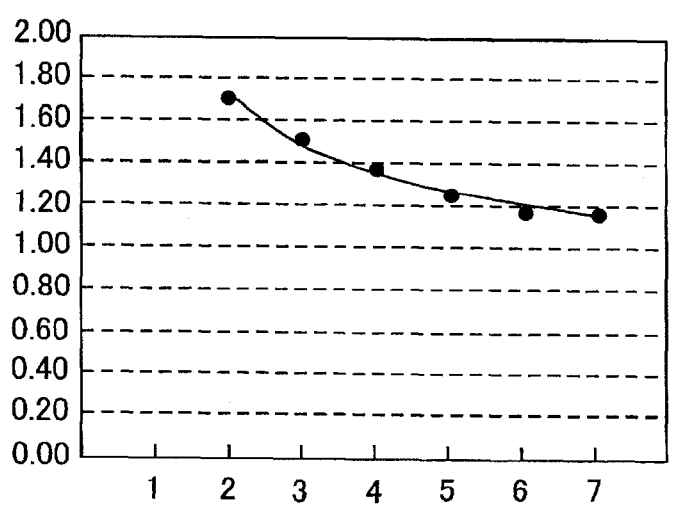

Here, the gear ratio and the gear ratio steps for seven forward speeds are as shown in FIGS. 5 and 6. As clear from FIGS. 5 and 6, the gear ratio steps are set to be at relatively regular intervals for the respective gear change stages. In more detail, the gear ratio steps show a tendency toward becoming smaller gradually as the gearshift goes up. That is, the difference between adjoining gear ratio steps when the gearshifts are made in turn is set to be very small. As a result, it is possible to make the gear shifting very smooth.

Further, the 1st speed driven gear 81 for the lowest speed is supported on the first output shaft 40, whereas the 7th speed driven gear 87 for the highest speed is supported on the second output shaft 50. Because the gear ratio for 1st speed should be the largest, the 1st speed driven gear 81 is made to be largest in diameter of the driven gears. On the other hand, because the gear ratio for 7th speed should be the smallest, the 7th speed driven gear 87 is made to be smallest in diameter of the driven gears. Therefore, the separation distance from the input shafts 20, 30 to the first output shaft 40 is set to be equal to the separation distance from the input shaft 20, 30 to the second output shaft 50 or to be longer than that separation distance.

According to the automatic dual-clutch transmission constructed as described hereinabove, the following effects can be accomplished.

The reverse gear 90 is supported on the first output shaft 40. Thus, since there is not provided any output shaft dedicated to the reverse gear, it is possible to downsize the whole of the apparatus in outer diameter. Further, the 2nd speed driven gear 82 has the large-diameter gear 82a and the small-diameter gear 82b. Then, the large-diameter gear 82a meshes with the 2nd speed drive gear 72, and the small-diameter gear 82b meshes with the reverse gear 90. That is, as also clear from FIG. 5, it is possible to set the gear ratio for reverse to be larger than the gear ratio for 2nd speed.

Further, the reverse gear 90 is supported on the first output shaft 40, and the 2nd speed driven gear 82 is supported on the second output shaft 50. Further, as mentioned earlier, the separation distance from the input shafts 20, 30 to the first output shaft 40 is set to be equal to the separation distance from the input shafts to the second output shaft 50 or to be longer larger than that separation distance. Thus, it is possible to make the reverse gear 90 larger in diameter than the large-diameter gear 82a of the 2nd speed driven gear 82. Accordingly, this can make it further reliably and easily to set the gear ratio for reverse to be larger than the gear ratio for 2nd speed.

In addition, the 2nd speed drive gear 72 is formed directly on the outer circumferential surface of the second input shaft 30. Further, the fourth gearshift clutch 104 is provided between the 2nd speed driven gear 82 and the 6th speed driven gear 86 which is provided on the left outside of the 2nd speed driven gear 82 in FIG. 1. In addition to this, the small-diameter gear 82b of the 2nd speed driven gear 82 is provided on right side of the large-diameter gear 82a in FIG. 1. With these constructions, the cutting ending portion which is on the left side in the axial direction of the effective gear tooth width of the 2nd speed drive gear 72 is located at the same position in the axial direction as the fourth gearshift clutch 104 exists, and the groove portion which is on the right outside in the axial direction of the effective gear tooth width is located at the same position in the axial direction as the small-diameter gear 82b exists. By arranging in these areas the cutting ending portion and the groove portion which are on both outsides of the effective gear tooth width, it is possible to give the 2nd speed drive gear 72 a sufficient effective gear tooth width without elongating the axial length of the second input shaft 30. As a result, it is possible to prevent the whole of the apparatus from being elongated in axial length.

Further, by providing the 3rd speed drive gear 73 and 5th speed drive gear 75 separately, the gear ratios for 3rd speed and 5th speed can be set to respective proper gear ratios.

The invention claimed is:

1. An automatic dual-clutch transmission comprising:
   a first input shaft and a second input shaft arranged coaxially,
   a first output shaft and a second output shaft arranged in parallel to the first input shaft,
   a dual clutch having a first clutch for transmitting a rotational drive power from a prime mover to the first input shaft and a second clutch for transmitting the rotational drive power to the second input shaft,
   a plurality of odd-number stage drive gears comprising gears for odd-number stages, fixedly provided on the first input shaft,
   a plurality of even-number stage drive gear comprising gears for even-number stages, fixedly provided on the second input shaft,
   a plurality of first driven gears provided on the first output shaft to be freely rotatable, including at least a lowest speed driven gear and meshing with some gears of the odd-number stage drive gears and the even-number stage drive gears,
   a plurality of second driven gears provided on the second output shaft to be freely rotatable, including at least a highest speed driven gear and meshing with remaining gears of the odd-number stage drive gears and the even-number stage drive gears,
   a reverse gear provided on the first output shaft to be freely rotatable and meshing with a 2nd speed driven gear of the plurality of second driven gears,
   a first output shaft side gearshift clutch for connecting a gear selected from the plurality of first driven gears and the reverse gear with the first output shaft not to be relatively rotatable, and
   a second output shaft side gearshift clutch for connecting a gear selected from the plurality of second driven gears with the second output shaft not to be relatively rotatable, wherein
   the 2nd speed driven gear comprises a large-diameter gear meshing with a 2nd speed drive gear of the even-number stage fixed gears, and a small-diameter gear provided bodily with the large-diameter gear, being fewer in tooth number and smaller in diameter than the large-diameter gear and meshing with the reverse gear,
   the 2nd speed drive gear is formed directly on an outer circumferential surface of the second input shaft,
   the second output shaft side gearshift clutch is provided between the large-diameter gear of the 2nd speed driven gear and the second driven gear provided to be adjacent to the 2nd speed driven gear on a side opposite to the dual clutch in the axial direction,
   the small-diameter gear is provided on the second output shaft on a dual clutch side in comparison with the large-diameter gear in the axial direction,
   a cutting portion is formed on the second input shaft, on the side opposite to the dual clutch side of the 2nd speed drive gear in the axial direction, at the same position in the axial direction where the output side gearshift clutch exists, and
   a groove portion is formed on the second input shaft, on the dual clutch side of the 2nd speed drive gear, at the same position in the axial direction where the small-diameter gear exists.

2. The automatic dual-clutch transmission in claim 1, wherein:
   on the first output shaft, the reverse gear, a 4th speed driven gear, a 3rd speed driven gear and a 1st speed driven gear are provided in turn from the dual clutch side in the axial direction,
   on the second output shaft, the 2nd speed driven gear, a 6th speed driven gear and a 5th speed driven gear are provided in turn from the dual clutch side in the axial direction,
   the first output shaft side gearshift clutch is composed of a clutch for connecting the reverse gear or the 4th speed driven gear with the first output shaft not to be relatively rotatable and a clutch for connecting the 3rd speed driven gear or the 1st speed driven gear with the first output shaft not to be relatively rotatable, and
   the second output shaft side gearshift clutch is composed of a clutch for connecting the 2nd speed driven gear or the 6th speed driven gear with the second output shaft not to be relatively rotatable and a clutch for connecting the 5th speed driven gear with the second output shaft not to be relatively rotatable.

3. The automatic dual-clutch transmission in claim 1, wherein:
   on the first output shaft, the reverse gear, a 4th speed driven gear, a 3rd speed driven gear and a 1st speed driven gear are provided in turn from the dual clutch side in the axial direction,
   on the second output shaft, the 2nd speed driven gear, a 6th speed driven gear, a 5th speed driven gear and a 7th speed driven gear are provided in turn from the dual clutch side in the axial direction, the 7th speed driven gear is provided on a side opposite in the axial direction to the dual clutch with respect to the 1st speed driven gear, the first output shaft side gearshift clutch is composed of a clutch for connecting the reverse gear or the 4th speed driven gear with the first output shaft not to be relatively rotatable and a clutch for connecting the 3rd speed driven gear or the 1st speed driven gear with the first output shaft not to be relatively rotatable, and the second output shaft side gearshift clutch is composed of a clutch for connecting the 2nd speed driven gear or the 6th speed driven gear with the second output shaft not to be relatively rotatable and a clutch for connecting the 5th speed driven gear or the 7th speed driven gear with the second output shaft not to be relatively rotatable.

4. The automatic dual-clutch transmission in claim 1, wherein the odd-number stage drive gears include:

a 3rd speed drive gear, and a 5th speed drive gear which differs from the 3rd speed drive gear in outer diameter and tooth number.

* * * * *